March 29, 1966  R. E. BENDL  3,243,219

HELICOPTER EXTERNAL CARGO HOOK

Filed Nov. 13, 1963  4 Sheets-Sheet 1

INVENTOR.
ROBERT E. BENDL
BY: Harry M. Saragovitz,
Edward J. Kelly,
Herbert Berl &
James W. Colvin March 29, 1966  R. E. BENDL  3,243,219
HELICOPTER EXTERNAL CARGO HOOK
Filed Nov. 13, 1963  4 Sheets-Sheet 2

INVENTOR.
ROBERT E. BENDL
BY: Harry M. Saragovitz,
Edward J. Kelly,
Herbert Berl &
James W. Colvin March 29, 1966     R. E. BENDL     3,243,219
HELICOPTER EXTERNAL CARGO HOOK
Filed Nov. 13, 1963     4 Sheets-Sheet 3

INVENTOR.
ROBERT E. BENDL
BY: Harry M. Saragovitz,
Edward J. Kelly,
Herbert Berl &
James W. Colvin March 29, 1966  R. E. BENDL  3,243,219
HELICOPTER EXTERNAL CARGO HOOK
Filed Nov. 13, 1963  4 Sheets—Sheet 4

INVENTOR.
ROBERT E. BENDL
BY: Harry M. Saragovitz,
Edward J. Kelly,
Herbert Berl &
James W. Colvin

United States Patent Office 3,243,219
Patented Mar. 29, 1966

3,243,219
HELICOPTER EXTERNAL CARGO HOOK
Robert E. Bendl, Denbigh, Va., assignor to the United States of America as represented by the Secretary of the Army
Filed Nov. 13, 1963, Ser. No 323,513
5 Claims. (Cl. 294—83)

The invention described herein may be manufactured and used by or for the Government for governmental purposes without the payment to me of any royalty thereon.

This invention relates to helicopter external cargo hooks and particularly to an open-throat hook for picking up and releasing cargo packages without the services of ground personnel to engage and release the hook.

It is among the objects of the invention to provide an improved external cargo pickup and release hook which can be suspended from a helicopter and operated by the helicopter pilot to pick up and release an air transportable cargo package without the assistance of ground personnel.

It is a further object to provide an improved external cargo hook having improved mechanism for releasably latching the hook in closed or load carrying condition which mechanism functions to latch or release the hook upon the application of operating forces much smaller than the operating forces required for the operation of external cargo hooks now in use.

It is a still further object of the invention to provide an external cargo hook having an elongated lever arm for holding the hook in closed or load carrying condition so that the forces on the latching mechanisms are reduced by the mechanical advantage incident to the geometry of the hook.

It is an additional object to provide an improved cargo hook having an improved latching mechanism using a pivoted latch dog and at least one dog controlling jaw slidably mounted on rollers for ease of operation.

Yet another object resides in the provision of an improved external cargo hook having a single pivotal connection with the supporting aircraft so that the hook can swing freely about at least one axis to pass over a cargo loop or other obstruction in the event the hook is not properly aligned on a cargo pickup pass of the associated aircraft.

Other objects and advantages will become apparent from a consideration of the following description and the appended claims in conjunction with the accompanying drawings wherein:

FIG. 6 is a fragmentary cross-sectional view of the lower portion of the hook substantially on the plane indicated by the line 6—6 on FIG. 1; and FIG. 7 is a fragmentary cross-sectional view substantially on a plane indicated by the line 7—7 on FIG. 6.

Figure 5:
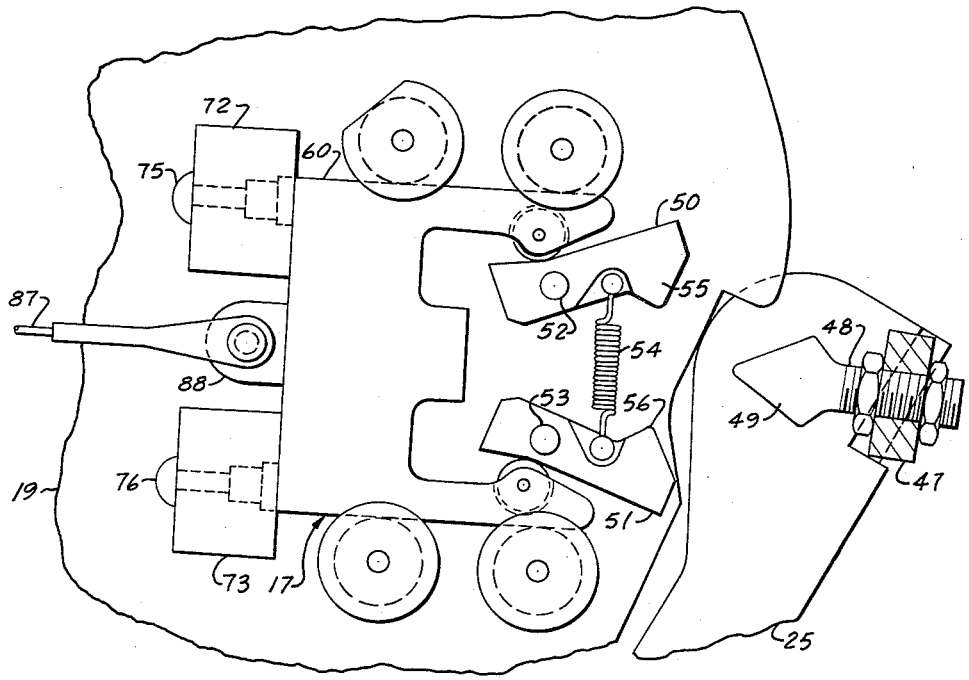
FIG. 5 is a fragmentary cross-sectional view similar to FIG. 4 showing the hook in unlatched condition.
Figure 4:
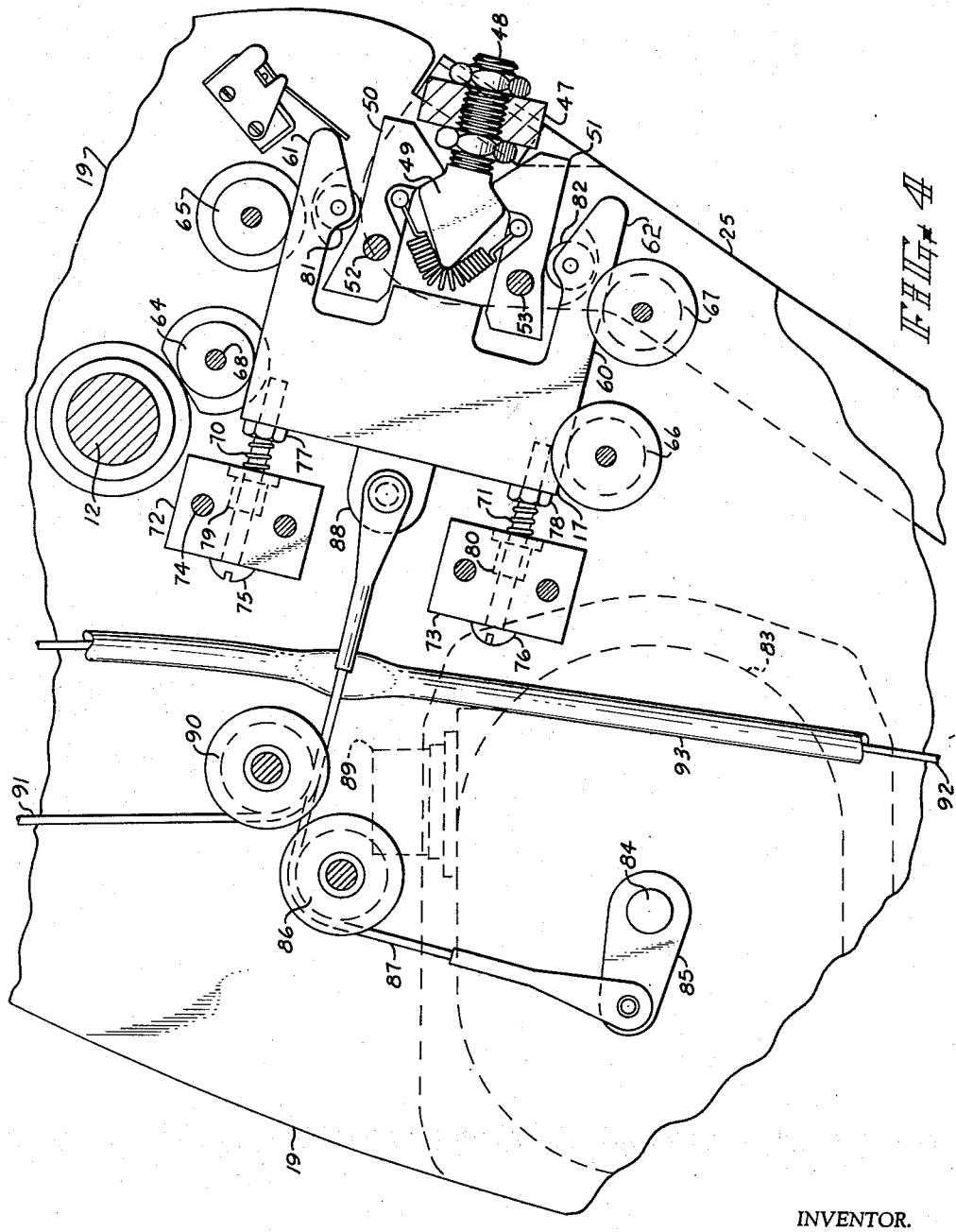
FIG. 4 is a fragmentary cross-sectional view substantially on a plane indicated by the line 4—4 on FIG. 3 with the hook in latched condition.

With continued reference to the drawings, the hook assembly comprises a frame, generally indicated at 10, a trapeze structure, generally indicated at 11, pivotally connected intermediate its length to the upper end of the frame 10 by a single pivotal connection 12, a hook beam generally indicated at 14, pivotally connected to the lower end of the frame 10 by a pivotal connection 15, a keeper 16 pivotally connected at one end to the frame and extending over the hook beam to prevent accidental release of an air-borne load from the hook, and a hook latching assembly particularly illustrated in FIGS. 4 and 5, and generally indicated at 17.

The above noted components constitute the major components of the hook assembly, but elements of these major components and other elements associated therewith will be specifically referred to as the description proceeds.

The cargo hook illustrated is of the type known as an open-throat hook and is particularly adapted to be slung beneath a rotary wing aircraft, such as a helicopter, for carrying air transportable cargo packages below and externally of the aircraft. This type of hook is particularly adapted for use in picking up and releasing air transportable cargo packages by the helicopter pilot without the assistance of ground personnel to engage the hook with the cargo package. A target ring assembly, such as that disclosed in the Becker Patent No. 3,005,653, may be secured to the cargo package to extend upwardly from the package for engagement by the open-throat hook. In order to release the package an electrical or mechanical release control is operated by the pilot to free the hook to open and release the target ring or other pickup device with which the hook is engaged.

The frame 10 comprises a pair of flat plates 18 and 19 secured together in spaced apart and substantially parallel relationship to each other by the pivotal mountings 12 and 15 and additional fasteners, such as the bolts 20, extending through spaced apart apertures near one edge of the frame and surrounded between the frame plates by suitable tubular spacers. The rear edge of the frame comprises a flat or long radius convex curve extending from the top to the bottom end of the frame and the front edge comprises a compound curve including a straight intermediate portion, a convex curve at the upper end of the intermediate portion and a concave curve of substantially arcuate shape at the lower end of the straight intermediate portion. The back and front edges of the frame are joined by a convex curve of arcuate shape concentric with the axis of the lower pivotal mounting 15.

The trapeze 11 comprises a pair of flat plates 21 and 22 of quadri-lateral shape disposed at the respectively opposite sides of the frame 10 and in overlapping relationship to the upper end portion of the frame. The pivotal mounting 12 comprises a pivot bolt extending through aligned apertures in the trapeze plates and the frame plates and having a hexagonal head on one end and a hexagonal nut on the opposite end. A tubular bushing surrounds the bolt 12 between the trapeze plates 21 and 22 and has end portions of reduced diameter received in the apertures in the frame plates 18 and 19 and an intermediate portion of enlarged diameter acting as a spacer between the two side plates of the frame. At its ends, the trapeze is provided with pivotally mounted links or tabs 23 and 24 which serve to connect the trapeze to a load sling suspended from the fuselage of an associated helicopter.

The hook 14 is a J-shaped member including an elongated, substantially straight leg or shank 25 lying along the straight portion of the forward edge of the frame 10 and a curved bight portion 26 continuous with the lower end of the shank 25 and apertured to receive the bolt of the pivotal mounting 15. It comprises a pair of side or flange members 27 and 28, disposed at respectively opposite sides of the frame 10, a web portion at the upper end of the hook and a web portion extending over a portion of the bill or bight and secured to the side portions 31 and 32 of the bight. A block 36 of solid material, such as rubber, is disposed between the side members of the hook bight at the outer end of the bight and is held in place by suitable means, such as the fasteners 37, and a saddle 38 of abrasion resistant material, such as hardened steel, overlies the bight portion of the hook to protect the hook against wear and facilitate the release of cargo packages from the hook.

The pivotal mounting 15 comprises a pivot bolt 34 extending through aligned apertures in the side members 31 and 32 of the bight of the hook and the frame walls 18 and 19 and provided with a head on one end and a nut threaded onto the other end. A sleeve 35 surrounds the bolt 34 between the hook side members and has reduced end portions fitting into the apertures in the side plates 18 and 19 of the frame and an enlarged intermediate portion which serves as a spacer between the frame plates 18 and 19. As shown in FIG. 7, saddle 38 is recessed to receive the head and nut of the bolt 34.

A pad 40 of resilient, abrasion resistant material, such as rubber or Teflon, is secured to and overlies the lower end portion of the frame 10 to protect the frame and also to prevent the hook from damaging the cargo items which it may strike during maneuvering to engage the hook with the lift ring of a cargo package.

The keeper 16 comprises a substantially straight bar of metal having a length substantially equal to the distance between the outer end of the bight of the hook and a location near the upper end of the hook shank 25 when the hook is closed. The keeper has a width or thickness such that it is loosely received between the side plates of the frame and passes freely between the side members of the hook shank. At its upper end the keeper is provided with an enlargement 41 of cylindrical shape having a concentric bore which receives a mounting pin 42 for pivotally connecting the keeper at its upper end to the frame 10 of the hook. Concentrically with the formation 41 the keeper is provided with a sector shaped formation 43 having therein an arcuate closed slot 44. A second pin 45 extends through the slot 44 to limit swinging movements of the keeper about the pivot pin 41 to the extent of the angle intercepted by the slot 44. The keeper is resiliently urged to its limiting position away from the front edge of the hook frame by a tension spring, not illustrated, connected between the keeper and the frame.

The mechanism 17 for latching the hook in closed position is particularly illustrated in FIGS. 4 and 5 and comprises an apertured block 47 set into the upper end of the hook shank and a tongue 48 having a screw threaded shank extending through the aperture in the block 47 and held in adjusted position relative to the block by suitable clamp nuts threaded onto the shank at respectively opposite sides of the block. This tongue has at its end directed toward the hook frame a somewhat diamond shaped or arrowhead shaped formation 49 which, when the hook is closed, passes between the forward edge portions of the frame plates 18 and 19 at the upper end of the hook shank 25 for engagement by latch mechanism disposed between the side plates of the frame.

The latch mechanism comprises a pair of spaced apart dogs 50 and 51 apertured near their rearward ends to receive pivot pins 52 and 53 which pins also extend through corresponding apertures in the frame plates 18 and 19 to pivotally mount the dogs to the frame. The pins 52 and 53 are spaced apart longitudinally of the hook frame and the dogs are resiliently urged together by a tension spring 54 connected at its ends to the dogs 50 and 51 forwardly of the pivot pins 52 and 53. At their forward ends the dogs are provided with mutually opposed formations 55 and 56 the outer and inner end surfaces of which are inclined relative to the longitudinal center lines of the corresponding dogs and intercept between them an angle of approximately 90 degrees. The outer end surface of the formation 55 on the upper dog 50 is inclined rearwardly and downwardly and the outer end surface of the formation 56 of the lower dog 51 is inclined upwardly and rearwardly so that, when the formation 49 on the tongue 48 is moved toward the dogs 50 and 51, it will force the free, forward ends of the dogs apart and pass between the formations 55 and 56. After the tongue formation 49 has passed between the dog formations 55 and 56 the rearward surfaces of the formations 55 and 56 will engage behind the inclined shoulders of the tongue formation 49 and securely lock the tongue, as shown in FIG. 4, to hold the hook shank 25 in the closed position of the hook. When the distal end of the tongue formation 49 strikes the spring 54, it bends this spring rearwardly and increases the tension of the spring on the dogs 50 and 51 to urge the free ends of the dogs into engagement with the tongue formation 49, this spring acting also to resiliently urge the tongue 48 outwardly of the latch mechanism when the dogs are forced apart to release the tongue, as will be presently described.

A lock bolt 60 in the form of a rectangular block is slidably mounted between the frame plates 18 and 19 and is provided with forwardly extending, spaced apart jaw formations 61 and 62 which extend along the upper edge of the dog 50 and the lower edge of the dog 51 respectively. This lock bolt is guided for reciprocating movement in a fore and aft direction by spaced apart upper guide rollers 64 and 65 bearing against the upper edge of the bolt and corresponding lower guide rollers 66 and 67 bearing against the lower edge of the bolt. The rollers are rotatably mounted on suitable pins or axles, as indicated at 68 for the roller 64, which extend concentrically through the corresponding rollers and through alligned apertures provided in the frame plates 18 and 19.

The bolt 60 is resiliently urged in a forward direction by compression springs 70 and 71 disposed between the rear end of the block 60 and abutment blocks 72 and 73 secured between the frame side plates by suitable means, such as the pins or rivets 74. A screw 75 extends slidably through a bore in the abutment block 72 and a similar screw 76 extends slidably through a bore in the abutment block 73. At their rearward ends these screws are provided with heads which bear against the rearward surfaces of the corresponding abutment blocks when the bolt 60 is in its limiting forward position and at their forward ends the screws are threaded into corresponding tapped wells in the rearward end of the bolt block 60. Lock nuts 77 and 78 are threaded onto the screws 75 and 76 respectively and bear against the rear end surface of block 60. The forward ends of the springs 70 and 71 bear against these lock nuts and the rearward ends of the spring are received in counter bores 79 and 80 provided in the forward end surfaces of the abutment blocks surrounding the corresponding screws. With this arrangement, contact of the screw heads against the rearward surfaces of the abutment blocks adjustably limits forward movement of bolt block 60 but this block can be pulled rearwardly against the resilient force of the springs 70 and 71.

The jaw 61 carries near its forward end a roller 81 which rides on the upper surface of the dog 50 and the jaw 62 carries a corresponding roller 82 which rides on the bottom surface of the dog 51. Rearwardly of the pin 52, the upper surface of the dog 50 is inclined upwardly and rearwardly, and rearwardly of the pin 53 the bottom surface of the dog 51 is correspondingly inclined rearwardly and downwardly. When the bolt 60 is moved rearwardly, the rollers 81 and 82 ride up on the correspondingly inclined portion of the roller engaged surfaces of the dogs 50 and 51 and force the forward ends of the dogs apart to release the tongue formation 49. When the bolt block is moved forwardly, the rollers 81 and 82 ride on the corresponding forward portions of the dogs 50 and 51 and force the forward ends of the dogs together and into engagement with the shoulders on the diamond formation 49, thereby positively holding the shank 25 in engagement with the dogs 50 and 51 and securely locking the hook in closed position.

A solenoid 83 is mounted on the outer side of the frame plate 18 rearwardly of and somewhat below the latch mechanism generally indicated at 17 and this solenoid has an oscillatable armature mounted on a shaft 84. The shaft 84 projects through an aperture in the frame plate 18 and an operating lever arm 85 is secured on the end of the shaft 84 and is disposed between the frame plates 18 and 19. A cable sheave 86 is rotatably mounted between the frame plates 18 and 19 above the solenoid 83 and a cable 87 is secured at one end to the outer or distal end of the arm 85, run over the sheave 86 and secured at its other end to an apertured lug 88 extending rearwardly from the bolt 60. With this arrangement, when the solenoid 83 is energized, the arm 85 pulls on the cable 87 and moves the bolts 60 rearwardly against the force of the springs 70 and 71. Suitable electrical conductors extend from a fitting 89 on the side of the solenoid to a switch in the pilot's compartment of the associated aircraft so that the pilot can control energization of the solenoid. When the pilot closes the switch to energize the solenoid, the hook is released and a load carried by the hook is disengaged from the hook and deposited in a supply area.

A second cable sheave 90 is rotatably mounted between the frame side plates somewhat above the sheave 86 and a cable 91 extends around this sheave and is also connected to the lug 88. The cable 91 runs directly to the pilot's compartment of the associated aircraft so that the pilot has an alternative manual release for the hook latch in the event the electric release should fail.

Figure 1:
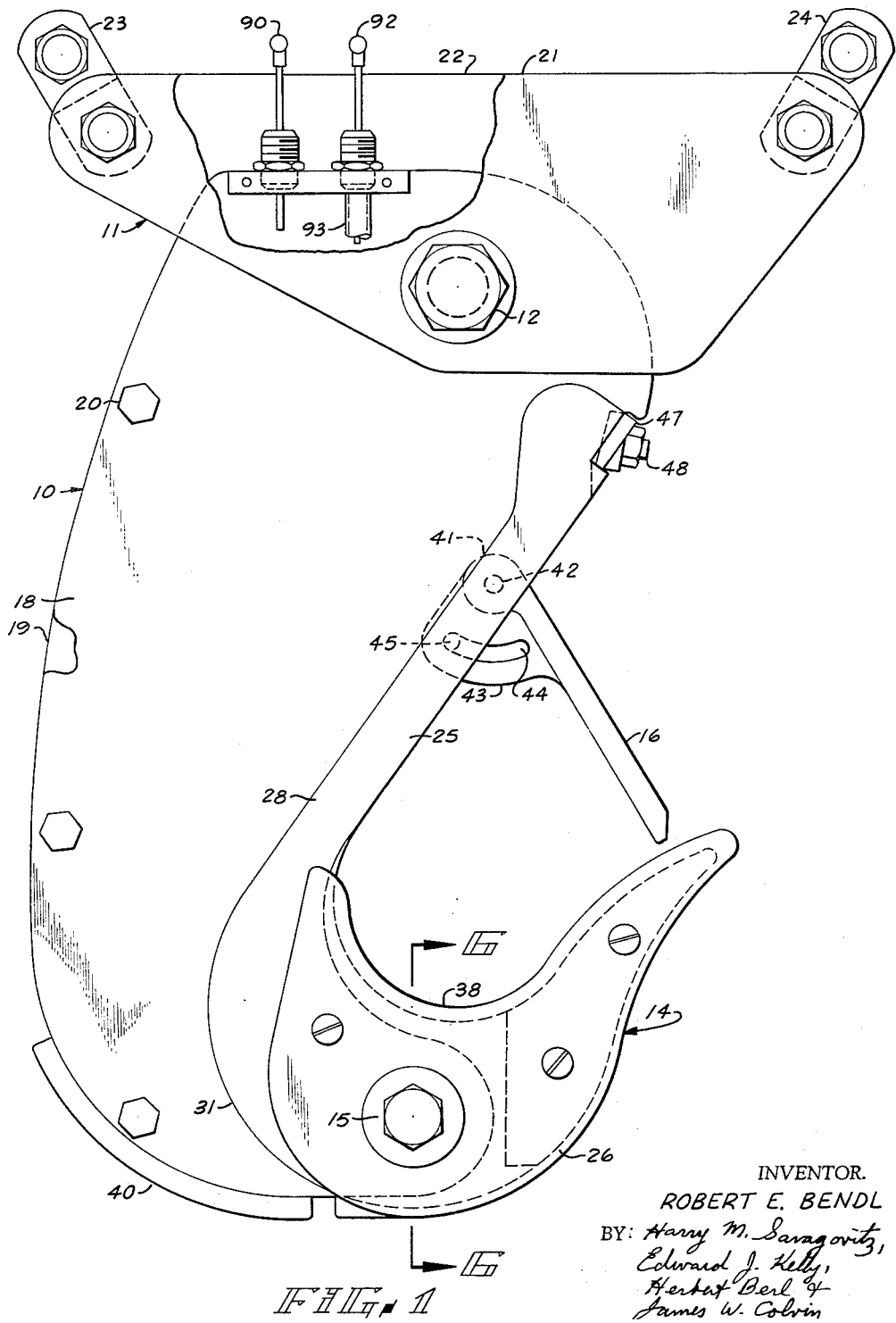
FIG. 1 is a side elevational view of a hook assembly constituting an operative embodiment of the invention with the hook in closed or load carrying condition.
Figure 2:
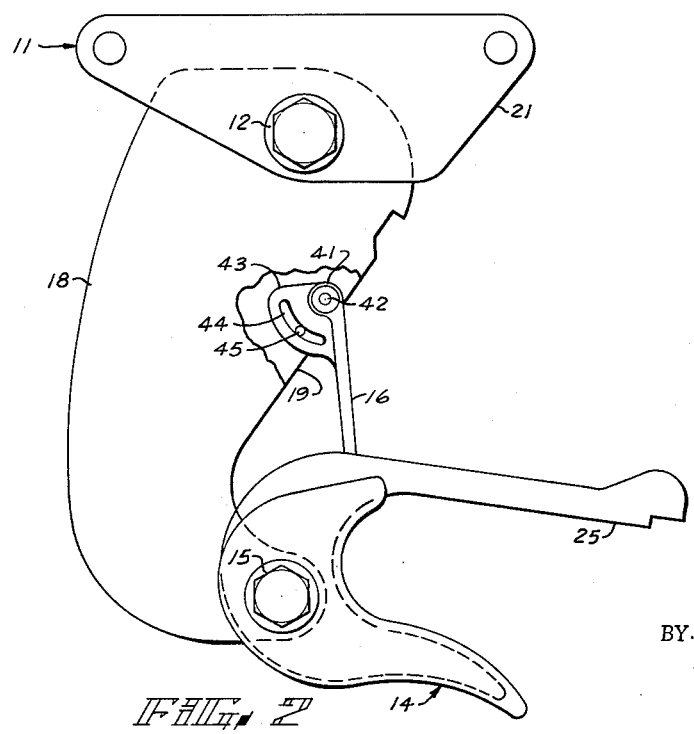
FIG. 2 is a side elevational view similar to FIG. 1 but on a reduced scale showing the hook in open or load releasing condition.
Figure 3:
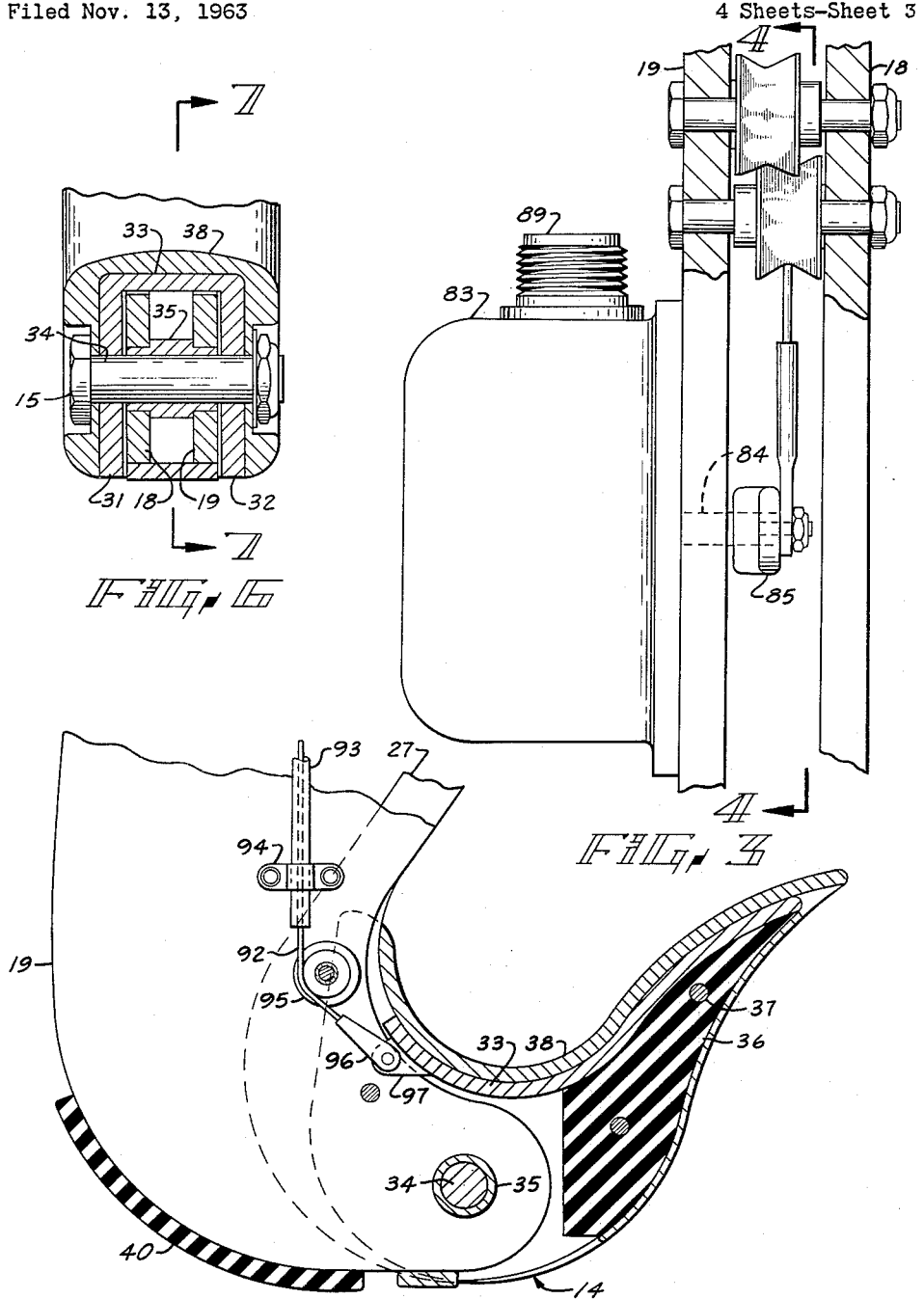
FIG. 3 is a fragmentary rear elevational view of the external cargo hook showing the automatic release mechanism.

After the hook has been released to disengage a load, as shown in FIG. 2, it could be returned to its load engaging condition, illustrated in FIG. 1, by a suitable tension spring or equivalent device. However, it is considered desirable to place the latching or cocking of the hook under the control of the pilot of the aircraft. For this purpose a cable 92 is run from the pilot's compartment of the aircraft between the plates of the trapeze 11 and into the upper end of a tubular sleeve 93 disposed between the side plates of the hook frame 10. This cable sleeve extends from the upper end of the frame to a location near the lower end of the frame, being clamped into position near its lower end by a clamp 94, FIG. 6, secured between the side plates of the frame. From the lower end of the sleeve 93 the cable runs under a rotatably mounted cable sheave 95 and is secured by a suitable fitting 96 to an apertured lug 97 projecting inwardly from the web of the bight portion of the hook above and somewhat rearwardly of the pivotal mounting 15 of the hook. By pulling on the cable 92 the pilot can turn the hook about the pivot bolt 34 and reengage the tongue formation 49 between the dogs 50 and 51 of the latch mechanism to lock the hook in cocked or load receiving condition, as explained above.

It will be noted that when the hook is in load carrying condition, as illustrated in FIG. 1, the load is applied to the hook above and slightly forwardly of the pivotal mounting 15 of the hook and that the shank 25 of the hook has a length several times the length of the lever arm through which the load acts to turn the hook about the pivotal connection 15. This provides a large mechanical advantage which renders the force applied between the tongue 48 and the latch mechanism very small in proportion to the weight of the cargo load carried by the hook so that the latch can be operated easily and can easily hold the hook in load carrying position with no danger of accidental release. It will also be noted that each jaw of the bolt block acting on the corresponding dogs 50 and 51 positively holds the diamond formation 49 on the lock tongue 48 so that the shank 25 cannot spring or otherwise move away from the formation 49 until the bolt is withdrawn, the bolt carrying rollers 64 to 67 inclusive reinforcing this engagement to an extent such that the hook cannot be accidentally released.

While an operative embodiment of the invention has been described above and illustrated in the accompanying drawings, it is to be understood that the scope of the invention is in no way limited to the particular embodiment so illustrated and described but is commensurate with the scope of the appended claims.

I claim:

1. A cargo hook for suspending an air transportable cargo package from an aircraft, such as a helicopter, comprising:
    (a) a frame having an upper end and a lower end and including a pair of flat plates secured in spaced apart and substantially parallel relationship to each other,
    (b) a hook beam comprising a curved bight portion and a substantially straight elongated stem extending from said bight portion,
    (c) a mounting element extending through the lower portion of said frame and the bight portion of said hook beam pivotally mounting said hook beam on said frame for swinging movements between a hook closed and a hook open position,
    (d) latch means releasably latching said hook beam in hook closed position comprising a pair of mutually opposed dogs disposed between and pivotally secured to said frame plates, a tongue secured to said stem at the distal end thereof and disposed between said frame plates and between said opposed dogs when said hook is closed, said tongue and said dogs having mutually engaging formations thereon so shaped that said tongue cannot be withdrawn from between said dogs without forcing said dogs apart, a bolt disposed between said frame plates and slidable between a locking position in which it positively holds said dogs against moving apart and a releasing position in which it frees said dogs to move apart to release said tongue, spring means acting between said frame and said bolt resiliently urging said bolt to said locking position, and manually controllable means connected to said bolt for moving said bolt to said releasing position.

2. A cargo hook for suspending an air transportable cargo package from an aircraft, such as a helicopter, comprising:
    (a) a frame having an upper end and a lower end and including a pair of flat plates secured in spaced apart and substantially parallel relationship to each other.
    (b) a hook beam comprising a curved bight portion and a substantially straight elongated stem extending from said bight portion,
    (c) a mounting element extending through the lower portion of said frame and the bight portion of said hook beam pivotally mounting said hook beam on said frame for swinging movements between a hook closed and a hook open position,
    (d) latch means releasably latching said hook beam in hook closed position comprising a pair of mutually opposed dogs disposed between and pivotally secured to said frame plates, a tongue secured to said stem at the distal end thereof and disposed between said frame plates and between said opposed dogs when said hook is closed, said tongue and said dogs having mutually engaging formations thereon so shaped that said tongue cannot be withdrawn from between said dogs without forcing said dogs apart, a bolt disposed betwen said frame plates and slidable between a locking position in which it positively holds said dogs against moving apart and a releasing position in which it frees said dogs to move apart to release said tongue, spring means acting between said frame and said bolt resiliently urging said bolt to said locking position, manually controllable means connected to said bolt for moving said bolt to said releasing position, rollers carried by said frame and supporting said bolt for movement between said locking position and said releasing position, and rollers carried by said bolt and engaging the outer surfaces of said dogs.

3. A cargo hook for suspending an air transportable cargo package from an aircraft, such as a helicopter, comprising:
   (a) a frame having an upper end and a lower end and including a pair of flat plates secured in spaced apart and substantially parallel relationship to each other,
   (b) a hook beam comprising a curved bight portion and a substantially straight elongated stem extending from said bight portion,
   (c) a mounting element extending through the lower portion of said frame and the bight portion of said hook beam pivotally mounting said hook beam on said frame for swinging movements between a hook closed and a hook open position,
   (d) latch means releasably latching said hook beam in hook closed position comprising a pair of mutually opposed dogs disposed between and pivotally secured to said frame plates, a tongue secured to said stem at the distal end thereof and disposed between said frame plates and between said opposed dogs when said hook is closed, said tongue and said dogs having mutually engaging formations thereon so shaped that said tongue cannot be withdrawn from between said dogs without forcing said dogs apart, a bolt disposed between said frame plates and slidable between a locking position in which it positively holds said dogs against moving apart and a releasing position in which it frees said dogs to move apart to release said tongue, spring means acting between said frame and said bolt resiliently urging said bolt to said locking position, and manually controllable means connected to said bolt for moving said bolt to said releasing position,
   (e) a trapeze disposed in overlapping relationship to the upper portion of said frame, and a bearing element extending through said trapeze and said frame and providing a pivotal connection supporting said hook from said trapeze.

4. A cargo hook for suspending an air transportable cargo package from an aircraft, such as a helicopter, comprising:
   (a) a frame having an upper end and a lower end and including a pair of flat plates secured in spaced apart and substantially parallel relationship to each other,
   (b) a hook beam comprising a curved bight portion and a substantially straight stem portion extending from and having a length materially greater than the length of the radius of curvature of said bight portion,
   (c) a mounting element extending through the lower portion of said frame and the bight portion of said hook beam pivotally mounting said hook beam on said frame for swinging movements between a hook closed and a hook open position,
   (d) latch means releasably latching said hook beam in hook closed position comprising a pair of mutually opposed dogs disposed between and pivotally secured to said frame plates, a tongue secured to said stem at the distal end thereof and disposed between said frame plates and between said opposed dogs when said hook is closed, said tongue and said dogs having mutually engaging formations thereon so shaped that said tongue cannot be withdrawn from between said dogs without forcing said dogs apart, a bolt disposed between said frame plates and slidable between a locking position in which it positively holds said dogs against moving apart to release said tongue, spring means acting between said frame and said bolt resiliently urging said bolt to said locking position, and manually controllable means connected to said bolt for moving said bolt to said releasing position.

5. A cargo hook for suspending an air transportable cargo package from an aircraft, such as a helicopter, comprising:
   (a) a frame having an upper end and a lower end and including a pair of flat plates secured in spaced apart and substantially parallel relationship to each other,
   (b) a hook beam comprising spaced apart and substantially parallel side members constituting a curved bight portion and a substantially straight stem portion extending from said bight portion, and a saddle of wear resistant material overlying said bight portion,
   (c) a mounting element extending through the lower portion of said frame and the bight portion of said hook beam pivotally mounting said hook beam on said frame for swinging movements between a hook closed and a hook open position,
   (d) latch means releasably latching said hook beam in hook closed position comprising a pair of mutually opposed dogs disposed between and pivotally secured to said frame plates, a tongue secured to said stem at the distal end thereof and disposed between said frame plates and between said opposed dogs when said hook is closed, said tongue and said dogs having mutually engaging formations thereon so shaped that said tongue cannot be withdrawn from between said dogs without forcing said dogs apart, a bolt disposed between said frame plates and slidable between a locking position in which it positively holds said dogs against moving apart and a releasing position in which it frees said dogs to move apart to release said tongue, spring means acting between said frame and said bolt resiliently urging said bolt to said locking position, and manually controllable means connected to said bolt for moving said bolt to said releasing position.

References Cited by the Examiner

UNITED STATES PATENTS

| | | | |
|---|---|---|---|
| 905,576 | 12/1908 | Porter | 294—83 |
| 2,448,817 | 9/1948 | McArthur. | |
| 3,012,811 | 12/1961 | Sandrock | 294—83 |
| 3,177,028 | 4/1965 | Cozzoli | 294—83 |

GERALD M. FORLENZA, *Primary Examiner.*

SAMUEL F. COLEMAN, HUGO O. SCHULZ,
*Examiners.*

G. F. ABRAHAM, *Assistant Examiner.*